March 23, 1948.
A. AEPPLI
2,438,138
MACHINE FOR GRINDING TOOTH FLANKS BY
MEANS OF PROFILE GENERATING DISCS
Filed Nov. 12, 1943
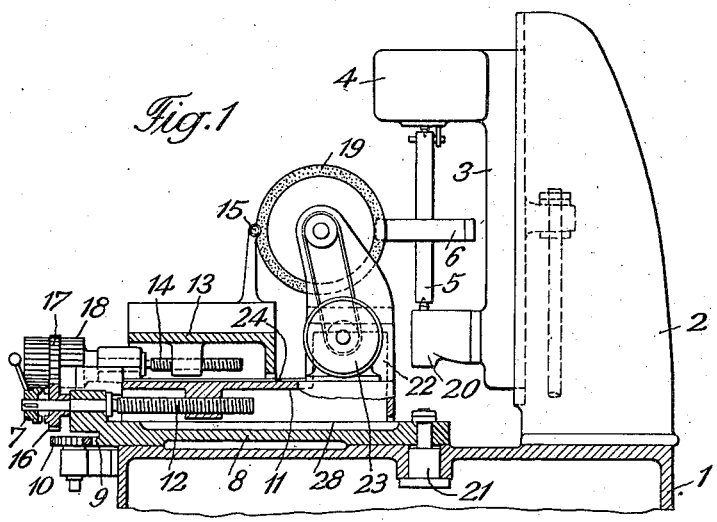
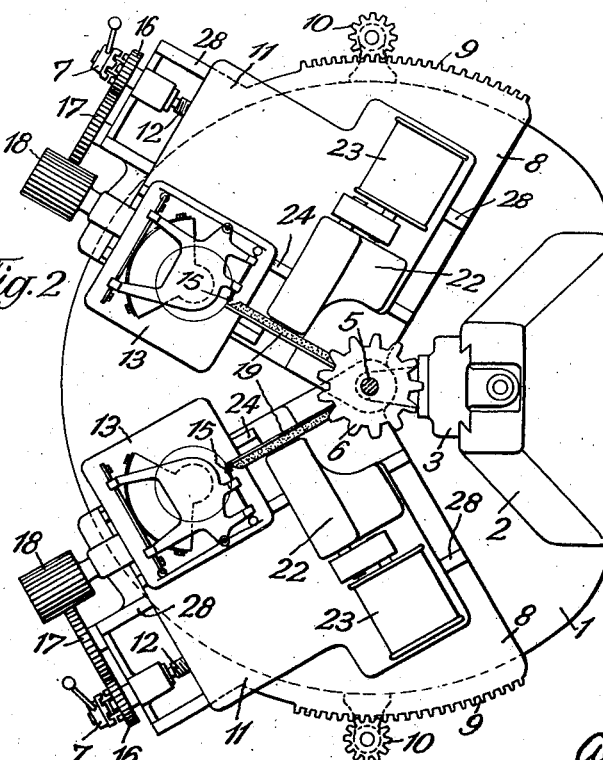
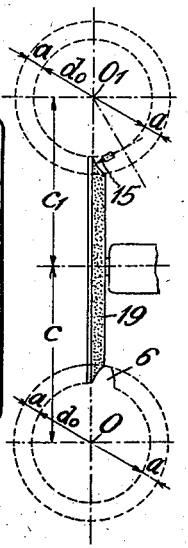
Inventor:
Albert Aeppli
by Sommers Young
Attorneys Patented Mar. 23, 1948

2,438,138

UNITED STATES PATENT OFFICE 2,438,138

MACHINE FOR GRINDING TOOTH FLANKS BY MEANS OF PROFILE GENERATING DISCS

Albert Aeppli, Zurich, Switzerland, assignor to Maag-Zahnräder und -Maschinen Aktiengesellschaft, Zurich, Switzerland Application November 12, 1943, Serial No. 510,029
In Germany June 18, 1942

1 Claim. (Cl. 51—92)

1

This invention relates to machines for grinding tooth flanks by means of profile generating discs.

The gear grinding machines operating by means of profile generating discs are either so constructed that the grinding disc in passing through the tooth gap grinds per traverse only one tooth flank or the construction is such that always two tooth flanks are ground at the same time. In grinding on both sides, the production is obviously greater than that resulting from grinding on one side only. However, in the latter case the drawback ensues that if one of the sides of the grinding disc works at a greater depth of cut than the other the disc is somewhat displaced to the latter side so that the respective profile portion is correspondingly ground out of true form and thus turns out to be less exact than if it had been ground with one side of the disc only. A further difficulty is encountered due to the fact that the tooth thickness cannot be varied by mere relative readjustment of the grinding disc and the work, but rather only by appropriately grinding or turning off the grinding disc. Further it will not do to turn off the grinding disc only on one side in the event that this side has been soiled with dirt as is likely to happen in working only on one tooth flank. With a view to obtaining the correct tooth thickness and disposition of tooth flank it is much more necessary always to rectify both sides of the grinding disc in which way the consumption of grinding discs is unnecessarily increased.

The present invention aims at eliminating said drawbacks attendant in grinding machines operating to work two flanks at the same time so as to combine the high efficiency of this kind of machines with the accuracy with which the machines working only one flank at a time operate.

This result is obtained by providing the machine with two profile generating discs adapted to operate at the same time, one of the discs working the tooth flanks on the left hand side and the other those on the right hand side and both discs being mounted on supports at least one of which can be pivotally adjusted about the axis of the work.

One embodiment of the invention is illustrated, by way of example only, in the accompanying drawings, in which Fig. 1 shows an elevation of the machine according to the invention;

Fig. 2 is a top plan view of the machine, and

Fig. 3 shows schematically the relative positions of the grinding disc, the work and the rectifying device.

2

In a vertical slide guideway on a standard 2 secured to the bed 1 of the machine a work slide 3 is reciprocated by means of a mechanical or hydraulic drive. This work slide carries a head stock casing 4 in which the work actuating spindle provided with a dividing appurtenance is accommodated. Between the point of this spindle and the centering point of a tail stock 20 that may be fastened to the slide a mandrel 5 carrying the work 6 is clampingly held. The latter is advanced by the dividing device step by step.

Coaxially with the work spindle, that is, the mandrel 5 in the bed 1 a pivot pin 21 is arranged. Further on the table provided by the bed 1 two sector like supporting plates 8 are mounted on this pivot pin, which plates carry circumferential teeth at 9 for being angularly adjusted and are each in mesh with an appertaining pinion 10 which is part of a driving mechanism connected with the bed 1. Said plates can be clamped fast in their positions of adjustment.

Each supporting plate 8 is provided with a slide track 28 along which a grinding disc carrier slide 11 is displaceable. Said carrier slide constitutes a bearing 22 for the grinding spindle which extends transversely of the slide track 28 and carries a grinding disc 19 and is driven by a motor 23. On the slide 11 further a slideway 24 is arranged which extends parallel with slide track 28. On the slideway 24 a slide 13 for the rectifying device is displaceably mounted.

The two slides support screw nuts interengaging with screw spindles 12 and 14 respectively (Fig. 1). The spindles 12 and 14 rest in bearings on the supporting plate 8 and on the slide 11 respectively. Further on the spindle 12 a handle carrier socket 7 is displaceably arranged by means of which the spindle 12 can be turned for adjusting the slide 11 in accordance with the diameter of the work.

The two spindles 12 and 14 can be united to commonly form a drive gearing. For this purpose on the spindle 12 a gear 16 is rotatably mounted which can be coupled with the socket 7 by axial displacement of the latter, and drives via an intermediary wheel 17 a gear 18 secured to the spindle 14.

The pitch of the two screw spindles 12 and 14 and the ratio of gearing of the gears 16 and 18 is so chosen that per one revolution of the spindle 12 the rectifying device carrier slide 13 travels relative to the pivotal support 8 so that the length of travel of the rectifying device carrier slide 13 is twice as long as the travel performed by the grinding disc carrier slide 11.

The rectifying device can be of any suitable type. The type shown in top plan view in Fig. 2 is provided with a sector like member constituting an arcuate guide for a pivotal holder, by relative rolling movement between which parts, as explained in my cognate application Serial No. 513,105, filed December 6, 1943, which issued as Patent No. 2,401,810, dated June 11, 1946, a diamond 15 for grinding or turning off the profile creating grinding disc 19 for trimming the gear teeth on the work 6 to precise form positively moves through an involute path.

In Fig. 3 another type of rectifying device is shown. This device works on the principle of relative rolling movement of two parts in that the joining line between the center $0_1$ of the rolling disc of the diameter $d_0$, which corresponds to the dedendum circle of the gear 6 to be worked, and the gear center 0 extends perpendicular to the axis of the grinding disc 19. Due to the fact that the distance $c_1$ must at all times be equal to the distance $c$, the grinding disc 19 requires to be shifted toward the gear center 0 for a distance $a$ if this disc is, for example, turned off a radial length equal to $a$, whereas the rectifying device requires to be advanced for the double amount. This explains why the above mentioned ratio of gearing between the slides 11 and 13 must exist.

The machine operates in such manner that the work 6, after the work slide 3 has completed a single traverse or has been traversed to and fro, is in any case rotationally advanced for one division. For adjusting the depth of cut the rotatable plates 8 are turned through a corresponding angle about the axis of the work. Upon choice, one of the rotatable plates 8 may remain in position of adjustment, in consequence whereof the work 6 (Fig. 2) and the other rotatable plate 8 must be turned. It is, however, simpler to effect the advance feed not by rotation of the work but by turning both of the two rotatable plates 8.

What I claim is:

In a machine for grinding tooth flanks by means of profile generating discs, means for holding in working position a workpiece to be formed with gear teeth, said work-holding means having an axis of rotation corresponding with the axis of the workpiece, means for moving the work holder axially to gradually bring the whole face width of the workpiece into contact with the grinding disc, two grinding discs having a profiled grinding edge each cooperating at the same time with a different tooth flank of said workpiece, said flanks facing in relatively opposite circumferential directions of the work, a mounting support arranged in the machine for each of said grinding discs, and means associated with both of said mounting supports for pivotally adjusting the respective mounting supports about the axis of rotation of the workpiece through an angle corresponding to the pitch of at least one tooth.

ALBERT AEPPLI.

REFERENCES CITED

The following references are of record in the file of this patent:

UNITED STATES PATENTS

| Number | Name | Date |
|---|---|---|
| 946,153 | Phelps | Jan. 11, 1910 |
| 1,183,020 | Maag | May 16, 1916 |
| 1,668,932 | Aeppli | May 8, 1928 |
| 1,858,568 | Wildhaber | May 17, 1932 |
| 2,329,428 | Ward | Sept. 14, 1943 |

FOREIGN PATENTS

| Number | Country | Date |
|---|---|---|
| 26,891 | Great Britain | Nov. 22, 1913 |